United States Patent
Wu et al.

(10) Patent No.: US 12,494,607 B2
(45) Date of Patent: Dec. 9, 2025

(54) POGO PIN MODULE AND CONTROL METHOD OF POGO PIN TEMPERATURE

(71) Applicant: Lanto Electronic Limited, Kunshan (CN)

(72) Inventors: Sheng-Wen Wu, Kunshan (CN); Chin-Kun Tsai, Kunshan (CN); Conglong Ma, Kunshan (CN); Shengbing Xing, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 332 days.

(21) Appl. No.: 18/372,349

(22) Filed: Sep. 25, 2023

(65) Prior Publication Data

US 2024/0372303 A1    Nov. 7, 2024

(30) Foreign Application Priority Data

May 4, 2023  (CN) .......................... 202310491393.X (51) Int. Cl.
*H01R 13/66* (2006.01)
*G05D 23/19* (2006.01)

(52) U.S. Cl.
CPC ......... *H01R 13/6683* (2013.01); *G05D 23/19* (2013.01)

(58) Field of Classification Search
CPC ............................ H01R 13/6683; G05D 23/19
USPC .................................................. 439/620.22
See application file for complete search history.

(56) References Cited

U.S. PATENT DOCUMENTS

| | | | |
|---|---|---|---|
| 10,197,623 B2* | 2/2019 | Worrall | G01R 1/07378 |
| 10,502,638 B2* | 12/2019 | Miura | G01K 1/143 |
| 11,039,530 B2* | 6/2021 | Hanazawa | H05K 1/18 |
| 2018/0368474 A1* | 12/2018 | Bache | A24F 40/30 |
| 2019/0069605 A1* | 3/2019 | Verleur | H02J 7/00 |
| 2020/0174063 A1* | 6/2020 | Huang | G01R 1/06722 |
| 2022/0023550 A1* | 1/2022 | Bache | G01N 27/041 |
| 2023/0129112 A1* | 4/2023 | Kabbani | G01R 1/0458 |
| | | | 324/750.07 |

FOREIGN PATENT DOCUMENTS

| | | |
|---|---|---|
| CN | 103379682 A | 10/2013 |
| CN | 111755917 A | 10/2020 |
| CN | 212303992 U | 1/2021 |
| CN | 218099446 U | 12/2022 |

(Continued)

*Primary Examiner* — Gary F Paumen
(74) *Attorney, Agent, or Firm* — MUNCY, GEISSLER, OLDS & LOWE, P.C.

(57) ABSTRACT

A pogo pin module and a control method of pogo pin temperature is provided. The pogo pin module includes a pogo pin assembly with a pogo pin, a sense control device, and a heating device. The sense control device is connected to the pogo pin and senses a pogo pin temperature. The heating device is connected to the sense control device. When the pogo pin temperature is less than a first temperature, the sense control device controls the heating device to heat the pogo pin such that the pogo pin temperature is greater than the first temperature to melt or evaporate a medium attached to the pogo pin. The pogo pin module and the control method of pogo pin temperature solves a problem that the conductivity of the pogo pin is worsened because the medium with the worse conductivity can be attached to the pogo pin.

14 Claims, 4 Drawing Sheets

(56) References Cited

FOREIGN PATENT DOCUMENTS

| | | | |
|---|---|---|---|
| DE | 102014102991 B3 | 9/2015 | |
| DE | 202018003420 U1 | 9/2018 | |
| JP | 7257880 B2 * | 4/2023 | ......... G01R 31/2893 |
| WO | WO-2020020591 A1 | 1/2020 | |

* cited by examiner

POGO PIN MODULE AND CONTROL METHOD OF POGO PIN TEMPERATURE

FIELD OF THE INVENTION

The present disclosure relates to a connector, and particularly relates to a pogo pin module and a control method of pogo pin temperature.

BACKGROUND OF THE INVENTION

A pogo pin is a connector formed by riveting or preliminary compressing a pin piston, a spring and a pin tube and is widely applied in various electronic products (such as a laptop, a watch, or a panel, etc.). The pogo pin is molded on a housing, and the molded pogo pin is welded on a flexible printed circuit board (FPCB) or on a wire to form a pogo pin module.

Some mediums (such as liquid water, steam, oil gas or the other gas mixture) in the environment where the pogo pin module is situated would undergo phase transition and would be solidified and attached to the surface the pogo pin when a temperature is lower than the transition points of the mediums. For example, when the temperature is lower than 0° C. under normal atmospheric pressure, the medium in the environment would be solidified and attached to the surface the pogo pin after the phase transition (for example, the steam or water would freeze). The conductivity of the solidified medium would be worsened (for example, the ice formed by the steam after the phase transition is a bad conductor) such that the conductivity of the pogo pin would be worsened and further the electrical signals transmitted by the pogo pin would be interrupted.

SUMMARY OF THE INVENTION

The object of the present disclosure is to provide a pogo pin module which may prevent the solidified medium with the worse conductivity from attaching on the surface of the pogo pin. The pogo pin module includes a pogo pin assembly, a sense control device, and a heating device. The pogo pin assembly includes a pogo pin. The sense control device is electrically connected to the pogo pin and senses a pogo pin temperature. The heating device is electrically connected to the sense control device, wherein when the pogo pin temperature is less than or equal to a first temperature, the sense control device controls the heating device to activate for heating the pogo pin such that the pogo pin temperature is greater than the first temperature in order to melt or evaporate the medium solidified and attached to the pogo pin.

In some embodiments, the sense control device includes a circuit board, and the circuit board is sandwiched between the pogo pin assembly and the heating device.

In some embodiments, one end of the pogo pin passes through the circuit board and is inserted into the heating device, and the circuit board is electrically connected to the pogo pin.

In some embodiments, the heating device includes a thermal conduction plate and a heating module. The one end of the circuit board, the thermal conduction plate and the heating module contact in order. The one end of the pogo pin passes through the one end of the circuit board, and is inserted into the thermal conduction plate, and contacts the heating module. A thermal conduction coefficient of the thermal conduction plate is less than a thermal conduction coefficient of the pogo pin.

In some embodiments, wherein the heating module includes a first thermally conductive shock-absorbing insulating plate and a heater. The thermal conduction plate, the first thermally conductive shock-absorbing insulating plate and the heater are located in order.

In some embodiments, wherein the heating module further includes a second thermally conductive shock-absorbing insulating plate and a thermal conduction case. The heater, the second thermally conductive shock-absorbing insulating plate and the thermal conduction case are located in order.

In some embodiments, the heating module further includes a housing where the pogo pin is embedded. At least a part of the circuit board is sandwiched between the housing and the thermal conduction plate, and the thermal conduction case is connected to the housing.

In some embodiments, the heater and the thermal conduction case are disposed at an interval. The first thermally conductive shock-absorbing insulating plate contacts the thermal conduction case, and a thermal conduction coefficient of the first thermally conductive shock-absorbing insulating plate, a thermal conduction coefficient of the second thermally conductive shock-absorbing insulating plate and a thermal conduction coefficient of air are less than a thermal conduction coefficient of the thermal conduction case.

In some embodiments, the thermal conduction case includes accommodation space where the thermal conduction plate, the first thermally conductive shock-absorbing insulating plate, the heater and the second thermally conductive shock-absorbing insulating plate are located.

In some embodiments, the heating module further includes a cable, and the thermal conduction case further comprises a wire through part. The cable is electrically connected to the sense control device and the heater respectively by way of the wire through part.

In some embodiments, the thermal conduction case includes a support part for supporting the circuit board.

In some embodiments, the sense control device further includes a programmable temperature switch electrically connected to the heating device.

The present disclosure further discloses a control method of pogo pin temperature performed by the aforementioned pogo pin module, the control method of pogo pin temperature comprising:
  receiving a pogo pin temperature signal sensed by the sense control device; and
  determining whether a temperature represented by the pogo pin temperature signal is less than or equal to the first temperature or not, when the temperature represented by the pogo pin temperature signal is less than or equal to the first temperature, controlling the heating device to activate for heating the pogo pin such that the temperature represented by the pogo pin temperature signal is greater than the first temperature in order to melt or evaporate the medium solidified and attached to the pogo pin.

In some embodiments, the control method of pogo pin temperature further includes:
  determining whether the temperature represented by the pogo pin temperature signal is greater than a second temperature or not, when the temperature represented by the pogo pin temperature signal is greater than the second temperature, controlling the heating device to stop heating the pogo pin.

The present disclosure discloses: the pogo pin assembly, the sense control device, and the heating device. The pogo pin assembly includes the pogo pin. The sense control device is electrically connected to the pogo pin and senses the pogo pin temperature. The heating device is electrically connected to the sense control device, when the pogo pin temperature is less than or equal to the first temperature, the sense control device controls the heating device to activate for heating the pogo pin such that the pogo pin temperature is greater than the first temperature in order to melt or evaporate the medium solidified and attached to the pogo pin. The medium solidified and attached to the pogo pin when the temperature is less than or equal to the first temperature may be heated by the heating device so that the medium solidified and attached to the pogo pin may be melted or evaporated when the temperature is greater than the first temperature, and the pogo pin could not interrupt the electrical signal transmitted by the pogo pin due to the surface of the pogo ping being attached with the solidified medium.

The aforementioned description of the present disclosure is merely the outline of the technical solutions of the present disclosure. In order to understand the technical solutions of the present disclosure clearly and to implement the present disclosure according to the content of the specification. The better embodiments of the present disclosure given herein below with accompanying drawings are used to describe the present disclosure in detail.

DETAILED DESCRIPTION

The specific embodiments of the present disclosure given herein below is used to explain the implementation of the present disclosure. A person skilled in the art easily understands the advantages and the effects of the present disclosure from the content of the present disclosure.

It should be noted that the embodiments and the features in the embodiments of the present disclosure can be combined with each other without conflict. The present disclosure will be described in detail below with reference to accompanying drawings and in conjunction with the embodiments. In order to provide those in the art with better understanding of the solution of the disclosure, the technical solutions in the embodiments of the present disclosure will be described clearly and completely below in conjunction with the accompanying drawings in the embodiments of the present disclosure. Apparently, the described embodiments are merely a part of the embodiments of the present disclosure and not all embodiments of the present disclosure. Based on the embodiments of the present disclosure, all other embodiments obtained by a person skilled in the art shall fall within the scope of protection of the present disclosure.

It should be noted that the terms "first", "second", etc. in the specification and claims of the present disclosure and in the aforementioned accompanying drawings are used to distinguish similar objects and need not be used to describe a particular order or sequence. Furthermore, the terms "comprising" and "having", and any variation thereof, are intended to encompass a non-exclusive inclusion, for example, a series of steps or units comprising processes, methods, systems, products or equipment need not be limited to those steps or units clearly listed but may include other steps or units not clearly listed or inherent to those processes, methods, products or equipment.

It should be noted that the terms "mount", "connect", "link" should be broadly interpreted, for example, may be a permanent connection, may be a dismountable connection or may be an integral connection; may be a mechanical connection or may be an electrically connection; may be a direct connection, may be a connection by intermediate mediums, or may be an interior connection between two components. For a person skilled in the art, the meaning of the aforementioned terms in the present disclosure may be understood upon specific situations.

First Embodiment

Figure 1:
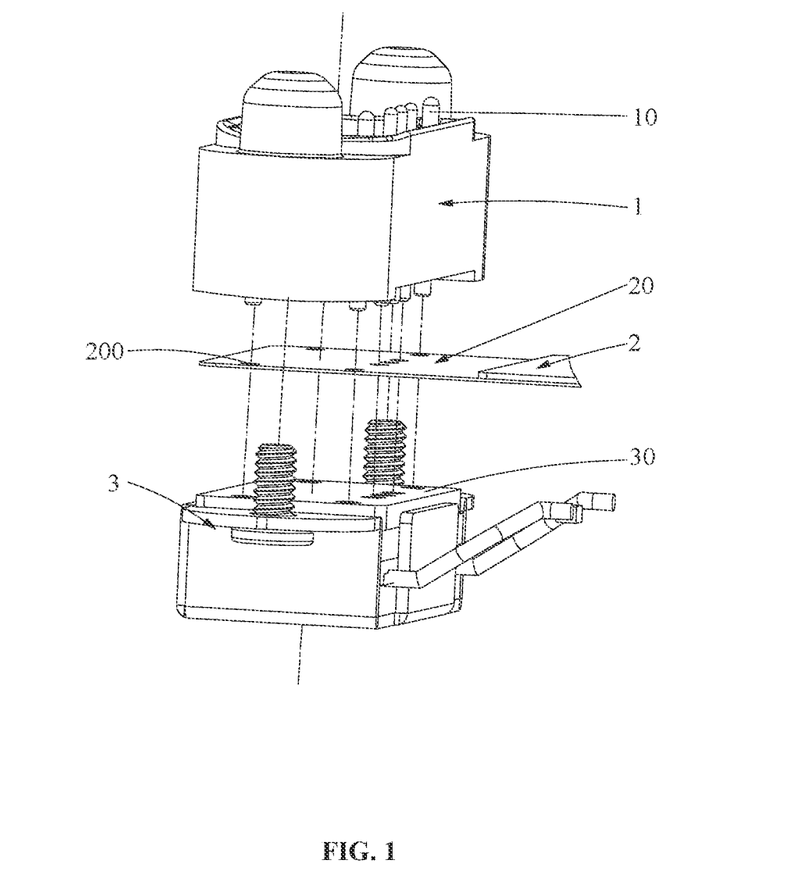
FIG. 1 is an exploded view diagram of a pogo pin module according to a first embodiment of the present disclosure (a circuit board undergoes a sectioning process)

As shown in FIG. 1, the present disclosure in the present embodiment provides a pogo pin module including: a pogo pin assembly 1, a sense control device 2 and a heating device 3. The pogo pin assembly 1 includes a pogo pin 10. The sense control device 2 is electrically connected to the pogo pin 10 and senses a pogo pin temperature. The heating device 3 is electrically connected to the sense control device 2, wherein when the pogo pin temperature is less than or equal to a first temperature, the sense control device 2 controls the heating device 3 to activate for heating the pogo pin 10 such that the pogo pin temperature is greater than the first temperature in order to melt or evaporate the medium solidified and attached to the pogo pin 10.

As shown in FIG. 1, the pogo pin 10 may be made of copper (Cu), and the pogo pin 10 may be Pogo Pin. The sense control device 2 may be an arbitrary device with functions of control and temperature measurement, and for example, the sense control device 2 may be a temperature switch; or the sense control device 2 may be a circuit board 20 with a microcontroller unit (MCU) and a temperature sensor; or the sense control device 2 may be a circuit board 20 with a central processing unit (CPU) and a temperature sensor. The sense control device 2 is electrically connected to the pogo pin 10 by tin soldering. The heating device 3 may heat the pogo pin 10 by non-contact methods, while the heating device 3 may heat the pogo pin 10 by contact methods as described in the following content of the present embodiment. The heating device 3 is electrically connected to the sense control device 2 by conductor lines or an integrated circuit (IC).

The heating device 3 may be an electrical heating device generating joule heating by electricity, such as resistance heating sheets, ceramics heating sheets or an infrared heater. The pogo pin temperature is a temperature of the pogo pin10. The sense control device 2 may monitor the pogo pin temperature. When the pogo pin temperature is less than or equal to the first temperature, the sense control device 2 may control the heating device 3 to activate for heating; when the pogo pin temperature is greater than the first temperature (for example, the first temperature is 15° C.), the sense control device 2 may control the heating device 3 to stop heating.

When the pogo pin temperature is less than or equal to the first temperature, the sense control device 2 controls the heating device 3 to activate for heating the pogo pin 10 such that the pogo pin temperature is greater than the first temperature. The medium solidified and attached to the pogo pin 10 when the temperature is less than or equal to the first temperature may be heated by the heating device 3 so that the medium solidified and attached to the pogo pin 10 may be melted or evaporated when the temperature is greater than the first temperature, and the surface of the pogo pin 10 could not interrupt the electrical signal transmitted by the pogo pin 10 due to the surface of the pogo ping being attached with the solidified medium.

The first temperature is a phase transition point where the solid medium is transformed into the liquid medium under the corresponding pressure. The medium may be ice solidified by steam or ice solidified by ionic liquids (e.g., NaCl). When the medium is the ice solidified by steam, the first temperature may be 0° C. under normal atmospheric pressure (1013.25 hPa). When the pogo pin temperature remains higher than 0° C., the melted medium may further be evaporated to become the steam. Under the other pressure, the first temperature may be the phase transition point where the ice is transformed from a solid state to a liquid state. When the pogo pin temperature is 0° C. under the normal atmospheric pressure, the ice would be attached to the surface of the pogo pin 10; when the pogo pin temperature is greater than 0° C., the ice is melted or evaporated. The medium may be the other substances of which the properties are similar to the ice, and of which the conductivities after the solid phase transition may worsen, and of which the conductivities after melt may be recovered.

As shown in FIG. 1, optionally, one of the sense control device 2 is sandwiched between the pogo pin assembly 1 and the heating device 3. One end of the pogo pin 10 passes through the one of the sense control device 2 and is inserted into the heating device 3. In two ends of the pogo pin 10, one end of the pogo pin 10 is inserted into the heating device 3, and the other end of the pogo pin 10 is electrically connected to a device to be connected (for example, the device to be connected is a screen of a laptop). The other end of the pogo pin 10 may transmit electrical signals to the device to be connected. For example, the top of the pogo pin 10 may be electrically connected to the device to be connected (for example, the top of the pogo pin 10 is inserted into the device to be connected). The bottom of the pogo pin 10 may pass through the sense control device 2 and be inserted into the heating device 3 to obtain the heat from the heating device 3.

As shown in FIG. 1, optionally, the sense control device 2 includes a circuit board 20. The circuit board 20 is sandwiched between the pogo pin assembly 1 and the heating device 3, the thermal conduction coefficient of the circuit board 20 is less than the thermal conduction coefficient of the pogo pin 10, the one end of the pogo pin 10 passes through the one end of the circuit board 20, and the circuit board 20 is electrically connected to the pogo pin 10. The circuit board 20 may be a flexible printed circuit (FPC) board. The pogo pin assembly 1, the the circuit board 20 and the heating device 3 may sequentially contact from top to bottom. The circuit board 20 may be sandwiched between the pogo pin assembly 1 and the heating device 3. The bottom of the pogo pin 10 may pass through the circuit board 20. It should be understood that the the circuit board 20 has a region with holes.

As shown in FIG. 1, the material of the circuit board 20 may be polyimide (PI) or polyethylene terephthalate (PET). The circuit board 20 may be electrically connected to the pogo pin 10 by tin soldering, and for example, after the bottom of the pogo pin 10 passes through the circuit board 20, the connection spot of the pogo pin 10 and the circuit board 20 is coated with tin to achieve the electrical connection between the pogo pin 10 and the circuit board 20. The MCU or CPU on the circuit board 20 may generate and transmit the electrical signals to the device to be connected. The thermal conduction coefficient of the circuit board 20 is less than the thermal conduction coefficient of the pogo pin 10 such that the heat transfer velocity of the heat generated by the heating device 3 on the pogo pin 10 could be greater the heat transfer velocity of the heat generated by the heating device 3 on the circuit board 20. Hence, the pogo pin 10 may be heated fast and the other components of the pogo pin assembly 1 (e.g., housing 11, the housing may refer to FIG. 3) are prevented from damaging because the pogo pin 10 is heated fast.

Figure 2:
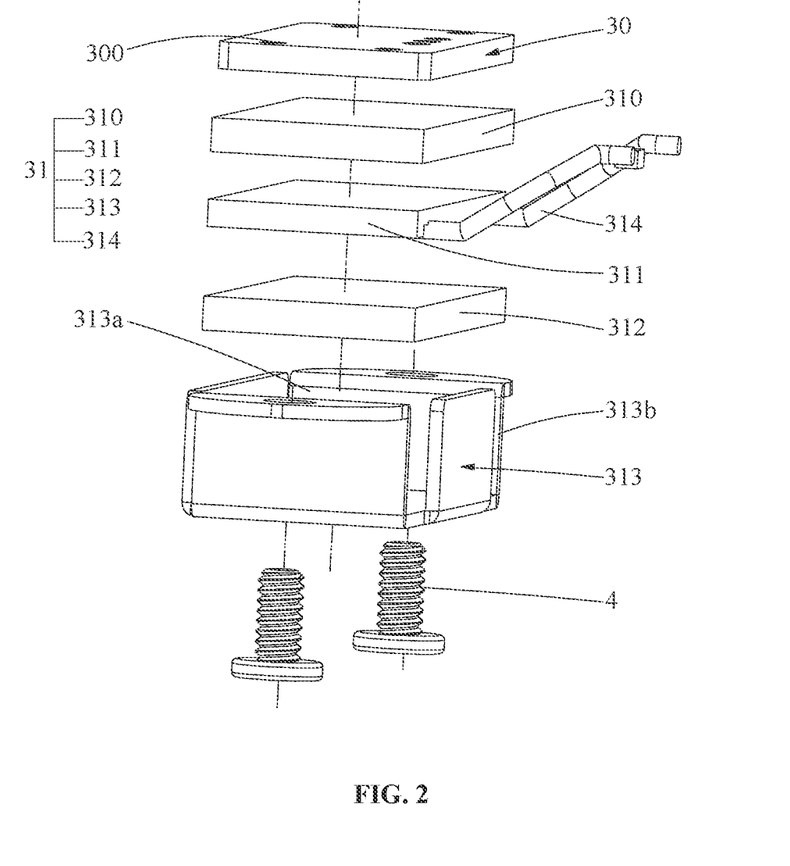
FIG. 2 is an exploded view diagram of a heating device according to the first embodiment of the present disclosure.

As shown in FIG. 1 and FIG. 2, optionally, the heating device 3 includes a thermal conduction plate 30 and a heating module 31. The circuit board 20 (the circuit board 20 may refer to FIG. 1, similarly hereinafter), the thermal conduction plate 30 and the heating module 31 contact in order, the one end of the pogo pin 10 (the pogo pin 10 may refer to FIG. 1, similarly hereinafter) passes through the circuit board 20, and is inserted into the thermal conduction plate 30, and contact the heating module 31, and the thermal conduction coefficient of the thermal conduction plate 30 is less than the thermal conduction coefficient of the pogo pin 10. The circuit board 20, the thermal conduction plate 30 and the heating module 31 may sequentially contact from top to bottom. The width of the circuit board 20 is greater than the length and the width of the thermal conduction plate 30.

As shown in FIG. 1 and FIG. 2, the thermal conduction plate 30 may be made of hard materials, and for example, the thermal conduction plate 30 may be made of hard and thermally conductive materials such as aluminum alloy and zinc alloy. The shape of the thermal conduction plate 30 may be a rectangular cuboid. The thermal conduction plate 30 may have the functions of the heat transfer and the support of the circuit board 20. The end end of the pogo pin 10 may contact the upper surface of the heating module 31, and for example, the end end of the pogo pin 10 may contact an upper surface of a first thermally conductive shock-absorbing insulating plate 310. The thermal conduction plate 30 and the pogo pin 10 contact the heating module 31, and the thermal conduction coefficient of the thermal conduction plate 30 is less than the thermal conduction coefficient of the pogo pin 10 such that the heat transfer velocity of the heat generated by the heating module 31 on the pogo pin 10 could be greater the heat transfer velocity of the heat generated by the heating module 31 on the thermal conduction plate 30. Hence, the pogo pin 10 may be heated fast and the circuit board 20 are prevented from damaging because the thermal conduction plate 30 is heated fast.

As shown in FIG. 1 and FIG. 2, optionally, the circuit board 20 includes a first hole 200, the thermal conduction plate 30 includes a second hole 300, and the one end of the pogo pin10 passes through the first hole 200 and the second hole 300. The first hole 200 and the second hole 300 may be circle through holes, and the pogo pin 10 may be cylindrical. The diameter of the pogo pin 10 is approximately equal to the diameter of the first hole 200.

As shown in FIG. 1 and FIG. 2, the diameter of the second hole 300 is greater than the diameter of the first hole 200 to prevent the one end of the pogo pin from contacting the thermal conduction plate 30 and to prevent the pogo pin 10 from short circuit by the thermal conduction plate 30 during the transmission of the electrical signals. The one end of the pogo pin 10 passes through the first hole 200 and the second hole 300, and the heated surface area of the one end of the pogo pin 10 is increased and the distance between the one end of the pogo pin 10 and the heater 311 is reduced in comparison with that the one end of the pogo pin 10 is directly against the surface (e.g., the upper surface) of the circuit board 20, and thus the one end of the pogo pin 10 is heated fast. The pogo pin 10, the first hole 200 and the second hole 300 may be coaxially disposed. The end end of the pogo pin 10 may pass through the first hole 200 and the second hole 300.

As shown in FIG. 1 and FIG. 2, optionally, the number of the first hole 200, the number of the second hole 300 and the number of the pogo pin 10 are all plural, and the plurality of the first holes 200, the plurality of the second holes 300 and the plurality of the pogo pins 10 are correspondingly disposed one by one. Each of the plurality of the first holes 200, each of the plurality of the second holes 300 and each of the plurality of the pogo pins 10 may correspond one by one and be coaxially disposed. The central axis line of each of the plurality of the first holes 200 may be disposed in parallel with each other. The central axis line of each of the plurality of the second holes 300 may be disposed in parallel with each other. The central axis line of each of the plurality of the pogo pins 10 may be disposed in parallel with each other. The shape of the thermal conduction plate 30 is slab, and each of the plurality of the first holes 200, each of the plurality of the second holes 300 and each of the plurality of the pogo pins 10 are correspondingly disposed one by one such that each of the plurality of the pogo pins 10 may be heated at the same time to prevent the individual pogo pin 10 from being solidified and attached by the medium without heating on time.

As shown in FIG. 2, optionally, the heating module 31 includes a first thermally conductive shock-absorbing insulating plate 310, a heater 311, a second thermally conductive shock-absorbing insulating plate 312 and a thermal conduction case 313, and the thermal conduction plate 30, the first thermally conductive shock-absorbing insulating plate 310, the heater 311, the second thermally conductive shock-absorbing insulating plate 312 and the thermal conduction case 313 contact in order. The thermal conduction plate 30, the first thermally conductive shock-absorbing insulating plate 310, the heater 311, the second thermally conductive shock-absorbing insulating plate 312 and the thermal conduction case 313 may sequentially contact from top to bottom. The shape of the first thermally conductive shock-absorbing insulating plate 310, the shape of the heater 311 and the shape of second thermally conductive shock-absorbing insulating plate 312 may be a laminar rectangular cuboid. The area of the first thermally conductive shock-absorbing insulating plate 310 is greater than the area of the thermal conduction plate 30, and the area of the first thermally conductive shock-absorbing insulating plate 310 is greater than the area of the heater 311.

As shown in FIG. 2, the first thermally conductive shock-absorbing insulating plate 310 and the second thermally conductive shock-absorbing insulating plate 312 are made of thermal conductive materials with absorption of vibration and insulation, and for example, the first thermally conductive shock-absorbing insulating plate 310 and the second thermally conductive shock-absorbing insulating plate 312 may thermal and electrical insulation pad or thermal and electrical insulation silicon pad. The heater 311 may be a ceramics heating pad or a thermal resistance heating pad. Because the heater 311 is sandwiched between the first thermally conductive shock-absorbing insulating plate 310 and the second thermally conductive shock-absorbing insulating plate 312, the pressure transmitted from the thermal conduction plate 30 and the thermal conduction case 313 to heater 311 is alleviated and the heater 311 is less likely to be compressed and damaged by the thermal conduction plate 30 and the thermal conduction case 313 in comparison with that the heater 311 directly contacts the thermal conduction plate 30 and the thermal conduction case 313. The thermal conduction case 313 may be made of metal materials such as stainless steel or aluminum alloy and so on.

As shown in FIG. 1 and FIG. 2, optionally, the thermal conduction case 313 includes accommodation space 313a, and the thermal conduction plate 30, the first thermally conductive shock-absorbing insulating plate 310, the heater 311 and the second thermally conductive shock-absorbing insulating plate 312 are located at the accommodation space 313a. The accommodation space 313a may be a rectangular cuboid and consists of four side plates and one bottom plate, and the top of the accommodation space 313a is empty to place the thermal conduction plate 30, the first thermally conductive shock-absorbing insulating plate 310, the heater 311 and the second thermally conductive shock-absorbing insulating plate 312. The thermal conduction plate 30, the first thermally conductive shock-absorbing insulating plate 310, the heater 311 and the second thermally conductive shock-absorbing insulating plate 312 are located at the accommodation space 313a so that the heat generated by the thermal conduction plate 30, the first thermally conductive shock-absorbing insulating plate 310, the heater 311 and the second thermally conductive shock-absorbing insulating plate 312 may transferred to the thermal conduction case 313 and be mixed fast with uniformity in the thermal conduction case 313 to prevent the heating device 3 from generating nonuniform heat.

As shown in FIG. 1 and FIG. 2, optionally, the heating module 31 further includes a cable 314, and the thermal conduction case 313 further includes a wire through part 313b, and the cable 314 is electrically connected to the sense control device 2 and the heater 311 by way of the wire through part 313b. The cable 314 may be a copper wire with a plastic jacket. The wire through part 313b is an opening disposed on the side plate of the thermal conduction case 313. Two ends of the cable 314 may be connected to the circuit board 20 and the heater 311 by tin. The opening disposed on the side plate of the thermal conduction case 313 may be rectangular and extend from the top surface of the thermal conduction case 313 to the interior bottom surface of the thermal conduction case 313, and the number of the cables 314 and the number of the openings are two and the cables and the openings are correspondingly disposed one by one. Each of the wire through parts 313b may be an opening or a wire through groove disposed on the side plate of the thermal conduction case 313, and the cable 314 may be prevented from passing through of the interior of the accommodation space 313a in comparison with that the cable 314 upward passes through the top of the thermal conduction case 313, and further the longer length of the cable 314 is prevented from being heated by the thermal conduction plate 30 and the first thermally conductive shock-absorbing insulating plate 310 to accelerate aging.

Figure 3:
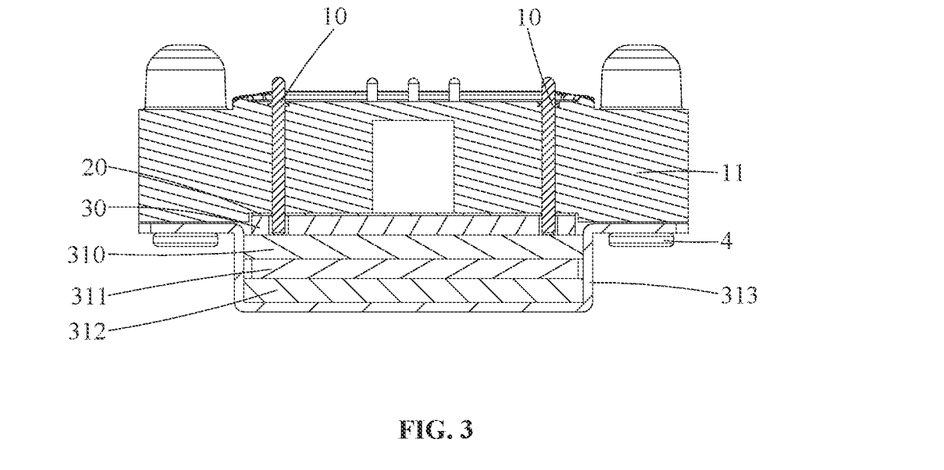
FIG. 3 is a cross section view diagram of the pogo pin module according to the first embodiment of the present disclosure (a cross section passes through a central axis line of two pogo pins, and springs in the two pogo pins are omitted, and the simplified springs are illustrated by the actual cross section)

As shown in FIG. 1 and FIG. 3, optionally, the pogo pin assembly 1 further includes a housing 11 where the pogo pin10 is embedded, and at least one part of the circuit board 20 is sandwiched between the housing 11 and the thermal conduction plate 30, and the thermal conduction case 313 is connected to the housing 11. Two ends of the pogo pin 10 are exposed relative to the housing 11, and the middle part of the pogo pin 10 may be embedded in the housing 11. For example, the middle part of the pogo pin 10 may be embedded in the housing 11 by double shot molding. The housing 11 may be connected to the heating device 3. The upper surface of the thermal conduction case 313 may contact the lower surface of the housing 11. The thermal conduction coefficient of the housing 11 may be less than the thermal conduction coefficient of the pogo pin 10. The housing 11 may be made of plastic materials. The thermal conduction case 313 may be connected to the housing 11 by screw connection, riveting or glue connection. For example, the upper part of the thermal conduction case 313 may be connected to the lower part of the housing 11 by screw 4.

As shown in FIG. 3, optionally, the heater 311 and the thermal conduction case 313 are disposed at an interval. The first thermally conductive shock-absorbing insulating plate 310 contacts the thermal conduction case 313, and the thermal conduction coefficient of the first thermally conductive shock-absorbing insulating plate 310, the thermal conduction coefficient of the second thermally conductive shock-absorbing insulating plate 312 and the thermal conduction coefficient of air are less than the thermal conduction coefficient of the thermal conduction case 313. The left side surface and the right side surface of the first thermally conductive shock-absorbing insulating plate 310 may respectively contact the inner sidewalls of the thermal conduction case 313. The left direction and the right direction of the first thermally conductive shock-absorbing insulating plate 310 refer to a viewer facing FIG. 3. The left side surface and the right side surface and the bottom surface of the second thermally conductive shock-absorbing insulating plate 312 may respectively contact the corresponding inner sidewalls of the thermal conduction case 313. The heater 311 and the thermal conduction case 313 are disposed at the interval, and in other words, the heater 311 would not contact the thermal conduction case 313 after the heater 311 is sandwiched between the first thermally conductive shock-absorbing insulating plate 310 and the second thermally conductive shock-absorbing insulating plate 312, and in other words, there is an air gap between the heater 311 and the thermal conduction case 313.

As shown in FIG. 3, because the thermal conduction coefficient of the first thermally conductive shock-absorbing insulating plate 310, the thermal conduction coefficient of the second thermally conductive shock-absorbing insulating plate 312 and the thermal conduction coefficient of air are less than the thermal conduction coefficient of the thermal conduction case 313, the heat generated by the heater 311 and transferred to the housing 11 through the thermal conduction case 313 to damage the housing 11 is delayed in comparison with that the heater 311 directly contact the thermal conduction case 313 so that the pogo pin 10 is prevented from the damage of the heat transferred by the heater 311 during heating. For example, when the housing 11 is made of plastic materials and the thermal conduction case 313 is heated fast, the medium solidified and attached to the pogo pin 10 could not be melted, and the bottom of the housing 11 could be damaged by the thermal conduction case 313.

Figure 4:
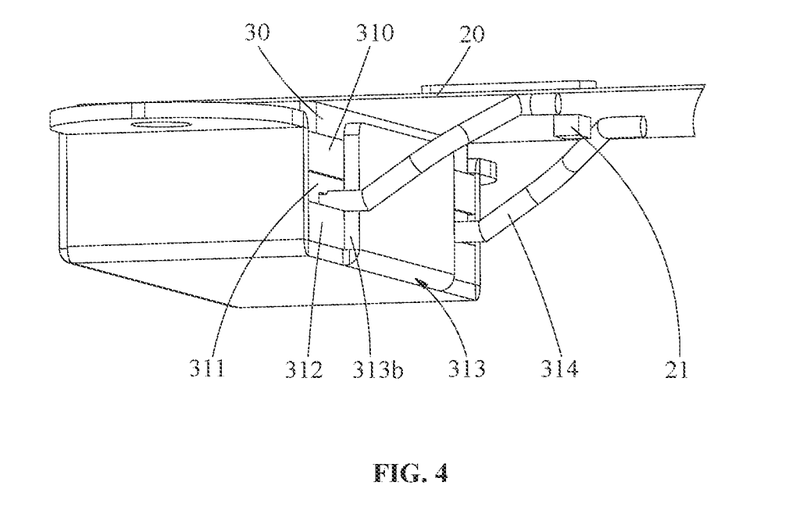
FIG. 4 is a 3D view diagram of the pogo pin module according to the first embodiment of the present disclosure (a pogo pin assembly and screws are omitted, and the circuit board undergoes the sectioning process)

As shown in FIG. 1 and FIG. 4, optionally, the sense control device 2 further includes a programmable temperature switch 21 electrically connected to the heating device 3. The programmable temperature switch 21 may be electrically connected to the heating device 3 by conductor lines. The programmable temperature switch 21 may be electrically connected to the heater 311. For example, the programmable temperature switch 21 is electrically connected to the heater 311 by an integrated circuit. The programmable temperature switch 21 may measure the temperature of the pogo pin 10 and control the switch of the heating device 3. For example, when the pogo pin temperature is less than or equal to the first temperature, the programmable temperature switch 21 may control the heater 311 to activate for heating pogo pin10; when the pogo pin temperature is greater than the first temperature, the programmable temperature switch 21 may control the heater 311 stop heating pogo pin10.

As shown in FIG. 1, FIG. 2 and FIG. 4, the programmable temperature switch 21 may be disposed on the circuit board 20 and be located outside the accommodation space313a, and for example, the programmable temperature switch 21 may be disposed on the lower surface of the circuit board 20 and be located on the right outer side of the thermal conduction case 313 (a left direction and a right direction refer to a viewer facing FIG. 4). The left direction and the right direction of the thermal conduction case 313 refer to a viewer facing FIG. 4. The lateral distance between the programmable temperature switch 21 and the pogo pin 10 may be shortened as possible to measure the temperature of the pogo pin 10 fast. In comparison with the cost of the conventional temperature sensor and the MCU to measure the pogo pin temperature and control the heater 311, the cost of the programmable temperature switch 21 to measure the pogo pin temperature and control the heater 311 is lower.

Second Embodiment

Figure 5:
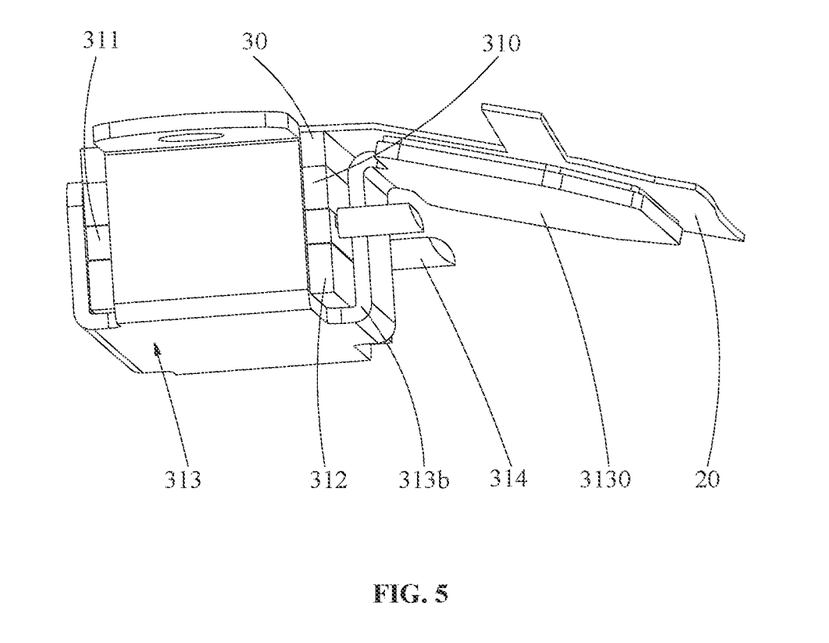
FIG. 5 is a 3D view diagram of the pogo pin module according to a second embodiment of the present disclosure (the pogo pin assembly and the screws are omitted, and the circuit board and a cable undergo the sectioning process)

As shown in FIG. 5, the present embodiment is approximately identical to the first embodiment. In the present embodiment, the thermal conduction case 313 further includes a support part 3130 for supporting circuit board 20. Optionally, the support part 3130 may be a sheet or a cross bar extending from the side surface of the thermal conduction case 313. For example, the support part 3130 may extend from the top of the side surface of the wire through part 313b disposed on the thermal conduction case 313. In the present embodiment, the width of the wire through part 313b is greater than the width of the wire through part 313b in the first embodiment.

The bottom surface of the circuit board 20 may be supported by the top surface of the support part 3130. The support part 3130 may downward extend from the top of the side surface of the thermal conduction case 313. The support part 3130 is the sheet for supporting the circuit board 20 and may hold up the the circuit board 20 by surface contact, and thus the pogo pin 10 is prevented from motioning relative to the circuit board 20 to be detached with each other when the pogo pin module moves up and down (e.g., falling). For example, the tin soldering connecting the pogo pin 10 to the circuit board 20 is broken.

Third Embodiment

Figure 6:
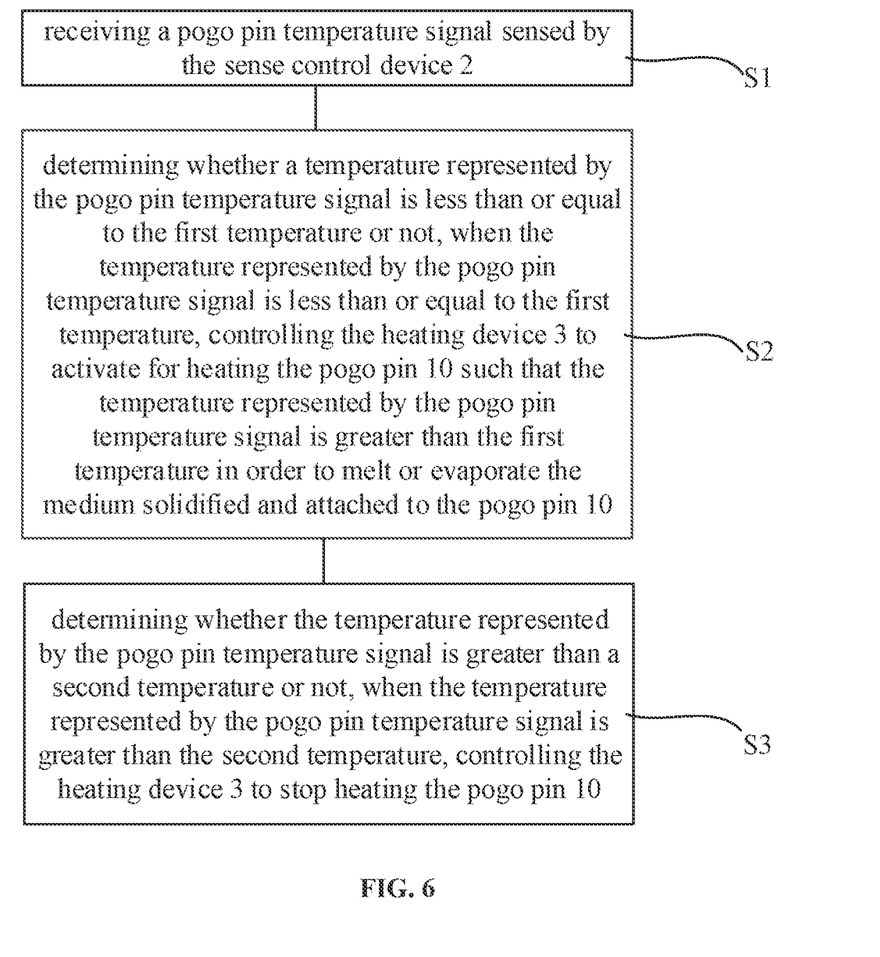
FIG. 6 is a flowchart diagram of a control method of pogo pin temperature according to a third embodiment of the present disclosure.

As shown in FIG. 1, the present disclosure in the present embodiment provides a pogo pin control method of pogo pin temperature performed by the pogo pin module in the first embodiment or the second embodiment including:

S1: receiving a pogo pin temperature signal sensed by the sense control device 2.

S2: determining whether a temperature represented by the pogo pin temperature signal is less than or equal to the first temperature or not, when the temperature represented by the pogo pin temperature signal is less than or equal to the first temperature, the sense control device 2 controls the heating device 3 to activate for heating the pogo pin 10 such that the temperature represented by the pogo pin temperature signal is greater than the first temperature in order to melt or evaporate the medium solidified and attached to the pogo pin 10. The medium may be the ice solidified by the steam, the first temperature may be 0° C. under normal atmospheric pressure, i.e. 1013.25 hPa, and the first temperature is the phase transition point where the solid medium is transformed into the liquid medium under the other pressure. The temperature represented by the pogo pin temperature signal is the pogo pin temperature.

The sense control device 2 may continue to sense the temperature of the pogo pin 10 and may control the heating device 3 to continue to heat the pogo pin 10 until the temperature of the pogo pin 10 is greater than the first temperature before controlling the heating device 3 to stop heating. When the temperature represented by the pogo pin temperature signal is less than or equal to the first temperature, the sense control device 2 controls the heating device 3 to activate for heating the pogo pin 10 such that the temperature represented by the pogo pin temperature signal is greater than the first temperature. Hence, the pogo pin 10 when the temperature represented by the pogo pin temperature signal is less than or equal to the first temperature may be heated by the heating device 3 so that the temperature represented by the pogo pin temperature signal is greater than the first temperature, and the surface of the pogo pin 10 could not interrupt the electrical signal transmitted by the pogo pin 10 due to the surface of the pogo ping being attached with the solidified medium.

S3: determining whether the temperature represented by the pogo pin temperature signal is greater than a second temperature or not, when the temperature represented by the pogo pin temperature signal is greater than the second temperature, the sense control device 2 controls the heating device 3 to stop heating the pogo pin 10. The second temperature may be a temperature higher than 0° C., and for example, the second temperature may be 15° C. When the temperature represented by the pogo pin temperature signal is greater than the second temperature, the sense control device 2 controls the heating device 3 to stop heating the pogo pin 10 in order to prevent the pogo pin 10 from being overheated.

For example, a controller and a memory may be disposed in the pogo pin module. The controller is electrically connected to the memory. Steps S1 to S3 may be stored in the memory by a form of computer instruction and be read and executed by the controller. The controller is electrically connected to the memory. For example, the controller is electrically connected to the memory by the conductor lines or the integrated circuit. The controller may be the MCU or the CPU in the sense control device 2, or the programmable temperature switch 21 in the first embodiment or the second embodiment. The memory may be RAM, ROM, EEPROM, CDROM or the other compact-disc storage, disk storage or the other disk storage device, flash memory or any medium which is configured to store the needed codes by a form of instruction or data structure and is accessed by a computer.

The pogo pin module and the control method of pogo pin temperature provided by the embodiments of the present disclosure is described in detail by the above description. A person skilled in the art would have changes in specific implementation and application scope according to the idea of the embodiments of the present disclosure. In view of the above description, the content of the present disclosure should not be construed as limitations of the present disclosure, and equivalent modification or changes according to the idea and the spirit of the present disclosure should be construed as being included within the claims of the present disclosure.

LIST OF REFERENCE SIGNS

1: pogo pin assembly
10: pogo pin
11: housing
2: sense control device
20: circuit board
200: first hole
21: programmable temperature switch
3: heating device
30: thermal conduction plate
300: second hole
31: heating module
310: first thermally conductive shock-absorbing insulating plate
311: heater
312: second thermally conductive shock-absorbing insulating plate
313: thermal conduction case
313*a*: accommodation space
313*b*: wire through part
3130: support part
314: cable
4: screw
S1-S3: steps of the control method of pogo pin temperature

The invention claimed is:

1. A pogo pin module comprising:
a pogo pin assembly comprising a pogo pin;
a sense control device electrically connected to the pogo pin and sensing a pogo pin temperature; and
a heating device electrically connected to the sense control device, wherein when the pogo pin temperature is less than or equal to a first temperature, the sense control device controls the heating device to activate for heating the pogo pin such that the pogo pin temperature is greater than the first temperature in order to melt or evaporate a medium solidified and attached to the pogo pin.

2. The pogo pin module according to claim 1, wherein the sense control device comprises a circuit board being sandwiched between the pogo pin assembly and the heating device.

3. The pogo pin module according to claim 2, wherein one end of the pogo pin passes through the circuit board and is inserted into the heating device, and the circuit board is electrically connected to the pogo pin.

4. The pogo pin module according to claim 3, wherein the heating device comprises a thermal conduction plate and a heating module, the circuit board, the thermal conduction plate and the heating module located in order, the pogo pin passes through the circuit board and is inserted into the thermal conduction plate, the pogo pin contacts the heating module, and a thermal conduction coefficient of the thermal conduction plate is less than a thermal conduction coefficient of the pogo pin.

5. The pogo pin module according to claim 4, wherein the heating module comprises a first thermally conductive shock-absorbing insulating plate and a heater, and the thermal conduction plate, the first thermally conductive shock-absorbing insulating plate and the heater are located in order.

6. The pogo pin module according to claim 5, wherein the heating module further comprises a second thermally conductive shock-absorbing insulating plate and a thermal conduction case, and the heater, the second thermally conductive shock-absorbing insulating plate and the thermal conduction case are located in order.

7. The pogo pin module according to claim 6, wherein the heating module further comprises a housing where the pogo pin is embedded, at least a part of the circuit board is sandwiched between the housing and the thermal conduction plate, and the thermal conduction case is connected to the housing.

8. The pogo pin module according to claim 6, wherein the heater and the thermal conduction case are disposed at an interval, the first thermally conductive shock-absorbing insulating plate contacts the thermal conduction case, and a thermal conduction coefficient of the first thermally conductive shock-absorbing insulating plate, a thermal conduction coefficient of the second thermally conductive shock-absorbing insulating plate and a thermal conduction coefficient of air are less than a thermal conduction coefficient of the thermal conduction case.

9. The pogo pin module according to claim 6, wherein the thermal conduction case comprises accommodation space where the thermal conduction plate, the first thermally conductive shock-absorbing insulating plate, the heater and the second thermally conductive shock-absorbing insulating plate are located.

10. The pogo pin module according to claim 6, wherein the heating module further comprises a cable, the thermal conduction case further comprises a wire through part, and the cable is electrically connected to the sense control device and the heater respectively by way of the wire through part.

11. The pogo pin module according to claim 6, wherein the thermal conduction case comprises a support part for supporting the circuit board.

12. The pogo pin module according to claim 6, wherein the sense control device further comprises a programmable temperature switch electrically connected to the heating device.

13. A control method of pogo pin temperature performed by the pogo pin module according to claim 1, the control method of pogo pin temperature comprising:
receiving a pogo pin temperature signal sensed by the sense control device; and
determining whether a temperature represented by the pogo pin temperature signal is less than or equal to the first temperature or not, when the temperature represented by the pogo pin temperature signal is less than or equal to the first temperature, controlling the heating device to activate for heating the pogo pin such that the temperature represented by the pogo pin temperature signal is greater than the first temperature in order to melt or evaporate the medium solidified and attached to the pogo pin.

14. The control method of pogo pin temperature according to claim 13, further comprising:
determining whether the temperature represented by the pogo pin temperature signal is greater than a second temperature or not, when the temperature represented by the pogo pin temperature signal is greater than the second temperature, controlling the heating device to stop heating the pogo pin.

\* \* \* \* \*